TRANSISTORIZED NEGATIVE RESISTANCE NETWORKS

Filed April 7, 1961 2 Sheets-Sheet 1

INVENTOR:
HEINZ RAILLARD,
BY Marvin A. Goldenberg
HIS ATTORNEY.

TRANSISTORIZED NEGATIVE RESISTANCE NETWORKS

Filed April 7, 1961 2 Sheets-Sheet 2

INVENTOR:
HEINZ RAILLARD,
BY Marvin A. Goldenberg
HIS ATTORNEY.

United States Patent Office 3,144,620
Patented Aug. 11, 1964

3,144,620
TRANSISTORIZED NEGATIVE RESISTANCE NETWORKS

Heinz Raillard, Syracuse, N.Y., assignor to General Electric Company, a corporation of New York
Filed Apr. 7, 1961, Ser. No. 101,583
7 Claims. (Cl. 331—111)

The present invention relates to novel transistorized negative resistance networks having improved operational characteristics, and in particular to improved two terminal negative resistance networks of the type employing a pair of complementary PNP and NPN junction transistors. Applicant's networks have particular advantage when employed as relaxation oscillators in providing improved stability and an enhanced frequency range of operation.

A network having a negative resistance characteristic of the kind the invention has primary relation to, commonly termed an "N" type characteristic, may be defined as one having a region of operation in which an increase in current through the network is accompanied by a decrease in voltage across it, and wherein the voltage is a single valued function of the current. The end points of said region are conventionally termed the peak and valley points. Transistorized negative resistance networks of the type employed in the present invention are disclosed in the Shaffner Patent No. 2,864,062, entitled "Negative Resistance Using Transistors." The negative resistance value and hence the operation of the prior art networks are determined largely by the transistor operating parameters. Since transistor devices have varying operating parameters, as well as inherent instabilities of these parameters, it is found that the peak and valley points of the negative resistance region of operation of such networks have a tendency to vary. Thus, their operation is unstable and also inflexible of adjustment, being confined within limits strongly dependent upon the transistor parameters. As a result, when considering relaxation oscillator operation, instabilities must be carefully avoided. In addition, the oscillator frequency range is limited.

Accordingly, it is an object of the present invention to provide a novel transistorized negative resistance network of improved operation.

It is another object of the invention to provide a novel transistorized negative resistance network whose negative resistance characteristic is essentially independent of the transistor parameters.

It is another object of the invention to provide a novel transistorized negative resistance network of improved stability.

It is still another object of the invention to provide a novel transistorized negative resistance network having an extended negative resistance region.

It is a further object of the invention to provide a novel transistorized negative resistance network employed as a relaxation oscillator of improved stability.

It is yet another object of the present invention to provide a novel transistorized negative resistance network employed as an oscillator having a greatly enhanced frequency range of operation wherein the frequency is changed by varying only one passive element, namely a resistor.

These and other objects of the invention are accomplished in one embodiment of the invention which includes a two terminal negative resistance network comprising a pair of complementary PNP and NPN junction transistors, each of said transistors having base, emitter and collector electrodes. A first terminal of the network is connected to the emitter electrode of the PNP transistor. The base electrode of the PNP transistor is joined to the collector electrode of the NPN transistor at a first common connection, and the base electrode of the NPN transistor is joined to the collector electrode of the PNP transistor at a second common connection. A source of energizing potential is coupled from its positive terminal through a first resistor to said first connection, the negative terminal of said source being coupled through a second resistor to the emitter electrode of said NPN transistor. The second terminal of the network is tapped to a point on said potential source. The source of energizing potential is poled so that the collector to base voltages of both transistors are of the proper polarity for transistor action. Let us assume that initially the emitter-base diode of the PNP transistor is biased in the backward direction so that neither transistor conducts. As the input voltage is increased a peak point is reached where the transistors turn on and begin to conduct in a regenerative mode, yielding a negative resistance characteristic. Regenerative conduction continues until the transistors become saturated, at which point the network assumes a positive resistance characteristic.

In accordance with one aspect of the invention, an external current path comprising a diode is connected between the said second connection and the negative terminal of the potential source for shunting a portion of the base current supplied to the NPN transistor around said transistor. The nonlinear conduction of the diode, as a function of the voltage across it, causes the input current at which the transistors saturate to be greatly increased, which is manifested by a flattening out and extension of the negative resistance region.

In accordance with a further aspect of the invention a resistor is inserted in the network in lieu of the diode which stabilizes the value of the negative resistance.

In accordance with a still further aspect of the invention a capacitance is inserted in the circuit of either of the above embodiments to provide operation as a relaxation oscillator. The diode embodiment provides operation at greatly increased frequencies, and the resistor embodiment provides improved stability of operation.

While the specification concludes with claims particularly pointing out and distinctly claiming the subject matter which is regarded as the invention, it is believed that the invention will be better understood from the following description taken in connection with the accompanying drawings in which:

Figure 1:
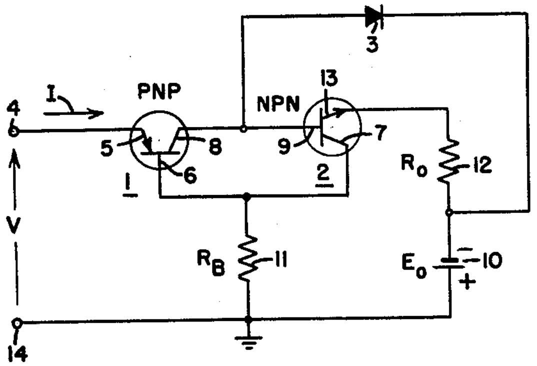
FIGURE 1 illustrates one embodiment of a two terminal transistorized negative resistance network employing a shunting diode element, in accordance with the invention.

Referring now to FIGURE 1, there is shown in accordance with one embodiment of the invention a two terminal transistorized negative resistance network wherein a shunting diode element 3 is employed in combination with a pair of complementary PNP and NPN transistors 1 and 2 connected in what has been termed in the art a PNPN configuration. The connection of the electrodes of transistors 1 and 2, plus the external circuitry, provide a negative resistance operating characteristic, and the shunting diode element 3 extends the negative resistance region over values of current several orders of magnitude greater than is possible without such element.

The first terminal 4 of the network is connected to the emitter electrode 5 of transistor 1. The base electrode 6 of transistor 1 is connected to the collector electrode 7 of transistor 2, and the collector electrode 8 of transistor 1 is connected to the base electrode 9 of transistor 2. An energizing potential source 10 of voltage $E_0$ has its negative terminal connected through a resistor 12 of resistance $R_0$ to the emitter electrode 13 of transistor 2. The positive terminal of source 10 is connected to the second network terminal 14, and through resistor 11 of resistance $R_B$ to the juncture of base and collector electrodes 6 and 7. Diode 3 is connected to the juncture of collector and base electrodes 8 and 9 and the negative terminal of source 10, and is poled in the same direction as the base-emitter diode of transistor 2 so as to conduct current away from said juncture.

It may be appreciated that since the transistors are complementary they may be readily interchanged, accompanied by the necessary reversal of potential connections and diode polarity. In addition, the complementary transistors may be readily replaced by a single PNPN or NPNP transistor which have been shown to function in an identical manner. An example of such teaching is found in an article by J. J. Ebers entitled, "Four-Terminal P–N–P–N Transistors," in the Proceedings of the IRE, vol. 40, No. 12, November 1952. The first P region of the PNPN transistor corresponds to the current injecting emitter electrode 5 of FIGURE 1; the first N region corresponds to the control base electrode 6 and to the collector electrode 7; the second P region corresponds to the floating collector and base electrodes 8 and 9; and the second N region corresponds to the current ejecting emitter electrode 13.

Figure 2:
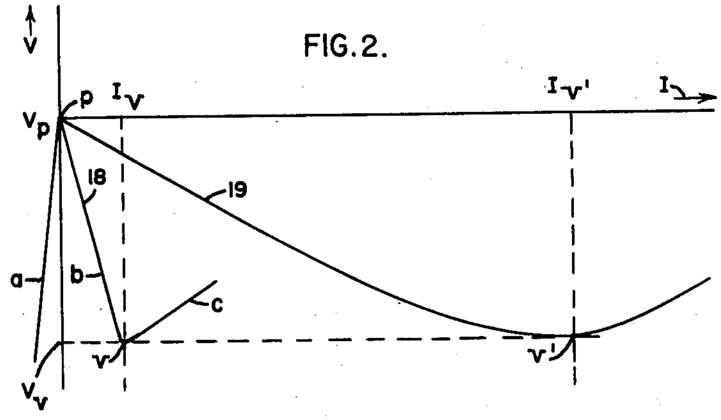
FIGURE 2 is a graph of two operating characteristics curves employed to explain the operation of the network of FIGURE 1.

The operation of the network of FIGURE 1 will first be described neglecting the effect of the shunting diode element 3. For the purpose of explanation, an input current source may be applied to terminal 4. If the voltage at terminal 4 provided by said source is less than the voltage at base electrode 6, provided by source 10, transistors 1 and 2 will be nonconducting. Under this condition the input current is negative and extremely small. This portion of the operation is shown by the region "*a*" of the operating characteristics curve 18 of FIGURE 2. As the voltage at terminal 4 is increased to a point at which the voltage at base 6 is exceeded, transistor 1 begins to conduct supplying current to base electrode 9 of transistor 2 which causes transistor 2 to conduct. A peak point *p* on the curve 18 is reached where in addition to the voltage across terminals 4–14 being sufficient to forward bias the emitter-base electrodes of transistor 1, the input current applied to terminal 4 becomes great enough to make the common emitter current amplification factor $\beta_2$ of transistor 2 larger than unity. The negative resistance region "*b*" follows the peak point *p*, in which region due to a regenerative action, the voltage across terminals 4–14 decreases as the input current increases. This may be appreciated by the fact that an increased conduction through resistor 11 is accompanied by a decreased voltage at the base 6 of transistor 1. Negative resistance operation continues until transistors 1 and 2 saturate, which occurs at the valley point *v* of the operating characteristics curve. Beyond the valley point the network assumes a positive resistance characteristic, denoted by region "*c*" of curve 18.

Considering the operation in an analytical sense, the voltage $V_p$ at the peak point is approximately zero, and the current $I_p$ at the peak point is extremely small relative to the valley current $I_v$, and approximately zero. In the negative resistance region "*b*" with both transistors 1 and 2 conducting, the terminal voltage V may be expressed as:

$$V \cong -I_R R_B \quad (1)$$

where $I_R$ is the current through resistance $R_B$. Equation 1 omits the emitter to base voltage drop of transistor 1 which is negligible. Since the common base current amplification factor $\alpha$ of the transistors approaches unity, the current I in the negative resistance region may be expressed as:

$$I \cong (1-\alpha_2) I_R \quad (2)$$

were $\alpha_2$ is the common base current amplification factor of transistor 2. Solving for $I_R$ and substituting in Equation 1, we have $$V \cong -\frac{IR_B}{1-\alpha_2} \quad (3)$$

The value of the negative resistance $R_n$ is the slope of the negative resistance portion of the operating characteristics curve which may now be expressed as:

$$R_n = \frac{dV}{dI} \cong -\frac{R_B}{1-\alpha_2} \quad (4)$$

Thus, it is seen that the negative resistance $R_n$ is a constant for constant values of $\alpha_2$.

The voltage $V_v$ at the valley point, where the voltage drop across the transistors is negligible, may be expressed as:

$$V_v \cong -\frac{E_0 R_B}{R_0 + R_B} \quad (5)$$

and the valley point current $I_v$ may be expressed as:

$$I_v \cong \frac{(1-\alpha_2)E_0}{R_0 + R_B} \quad (6)$$

Let us now consider the effect of inserting in the network the diode 3. During conduction of the transistors, the diode may be seen to shunt current away from the base electrode 9 of transistor 2 in accordance with its voltage, which is essentially the voltage across resistor 12. The diode conducts in the forward direction in a nonlinear fashion in accordance with its voltage versus current characteristics, presenting a relatively high impedance at low voltages and a very low impedance at higher voltages. Thus, for low conduction of the transistors 1 and 2, diode 3 conducts slightly and for high conduction of the transistors, the diode conducts greatly, in accordance with the diode voltage as determined by the value of resistor 12. Accordingly, the input current applied to terminal 4 that will cause saturation of transistor 2 is now several orders of magnitude greater than previously, indicated by valley point *v'* on the new operating characteristics curve 19 of FIGURE 2.

The current at the peak point with the diode inserted is approximately two times the original peak current, since for small currents the impedance of the emitter-base diode of transistor 2 and the diode 3 are approximately equal. At the new valley point *v'*, the current $I_v'$ may be expressed as:

$$I_{v'} = I_v + \frac{I_D}{\alpha_1} \quad (7)$$

where $I_D$ is the current through diode 3 and $\alpha_1$ is the common base current amplification factor of transistor 1. At saturation the diode current is much larger than the base to emitter current so that the valley current is now greatly increased, as is the ratio of the valley current to the peak current. The voltages at the peak and valley points are not changed by the presence of the diode.

It may be appreciated that, in lieu of the diode, other types of varistors may be employed which have similar nonlinear current versus voltage characteristics, such as a Thyrite.

Figure 3:
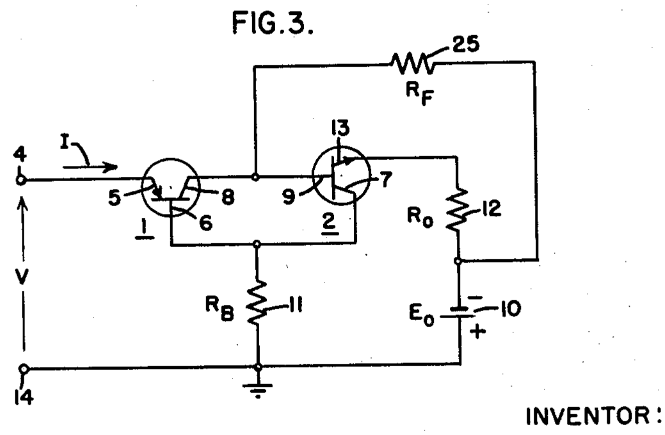
FIGURE 3 illustrates in accordance with the invention a second embodiment of a two terminal network employing a shunting resistor element.

Referring now to FIGURE 3, a shunting resistor 25 of resistance $R_F$ is inserted in the network in lieu of diode 3 for stabilizing the negative resistance value. The remaining components are as in FIGURE 1 and are similarly identified. The operation of the network is comparable to that previously described except now a resistor, having a linear voltage-current characteristic, is employed to shunt current around transistor 2. When suitably selected, resistor 25 insures that the negative resistance is a function of essentially only passive elements in the network.

The peak voltage and current are again approximately zero. The valley voltage $V_v$ may be given by the expression in Equation 5. The valley current $I_v$ may be derived so as to be expressed as:

$$I_v \cong \frac{E_0}{(R_B+R_0)\left(-\frac{1}{\beta_1}+\frac{R_F}{R_0+R_F/\beta_2}\right)} \quad (8)$$

where $\beta_1$ and $\beta_2$ denote the common emitter amplification of transistors 1 and 2, respectively. If the shunting resistor $R_F$ is assigned a value such that $$\beta_1 \gg \frac{R_0}{R_F} \gg \frac{1}{\beta_2}$$

Equation 8 degenerates into $$I_v \cong \frac{E_0 R_0}{R_F(R_B+R_0)} \quad (9)$$

The negative resistance is the quotient of $V_v$ and $I_v$ and may now be expressed as:

$$R_n \cong -R_B R_F / R_0 \quad (10)$$

rather than as expressed in Equation 4 where $\alpha_2$ is present. Since the magnitude of the negative resistance is now essentially dependent upon passive elements and since the peak and valley voltages are essentially fixed, the peak and valley currents accordingly are stabilized which stabilizes the network operation.

As an example of values assigned to $R_F$, for a $\beta_1$ and $\beta_2$ of 100 and an $R_0$ of 750 ohms, $R_F$ can be in the range of 75 to 7500 ohms, for good stability.

Figure 4A:
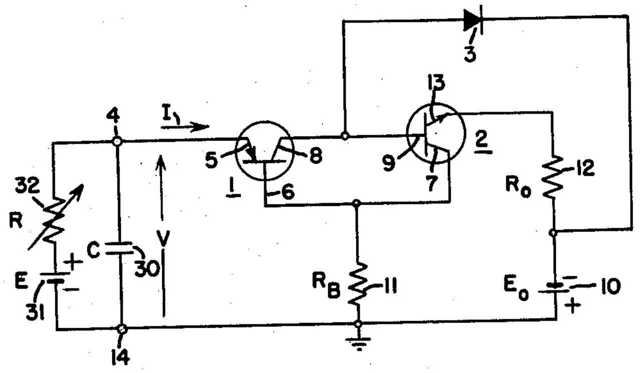
FIGURE 4A illustrates a relaxation oscillator embodiment employing the invention as illustrated in FIGURE 1.
Figure 4B:
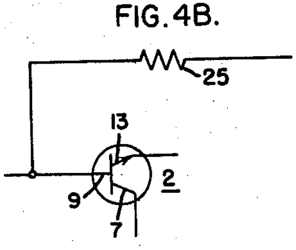
FIGURE 4B illustrates a modification of FIGURE 4A wherein the shunting resistor may be employed in lieu of the shunting diode.

Stabilization of the peak and valley currents, provided by the shunt resistor 25, as well as an increase in the valley current, accomplished by the shunting diode 3, is particularly useful when operating the network as a relaxation oscillator, as illustrated in FIGURES 4A and 4B. The shunting diode in FIGURE 4A allows the oscillator to operate over a frequency range several orders of magnitude greater than without such element. The shunting resistor inserted in lieu of the diode, as illustrated in FIGURE 4B, provides stability of operation of the oscillator circuit essentially independent of the transistor parameters. This feature in addition to improving stability, can also be used to increase the frequency range of operation.

In FIGURE 4A a capacitor 30 of capacitance C is coupled between the terminals 4 and 14. In addition, an input voltage source 31 of voltage E and variable charging resistor 32 of resistance R are illustrated as serially connected between terminals 4 and 14. The negative terminal of source 31 is connected to terminal 14 and the positive terminal of source 31 is connected through variable resistor 32 to terminal 4. The remaining components are identical to those of FIGURE 1 and are similarly identified.

Figures 5, 6:
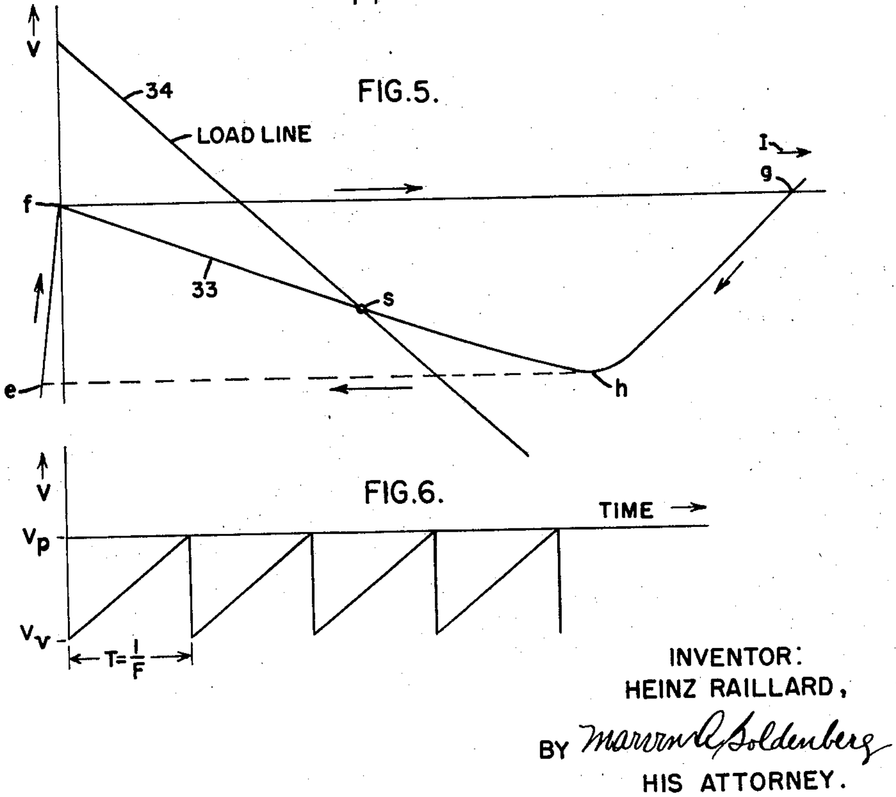
FIGURE 5 shows operating characteristics curves for the oscillator device of FIGURE 4A.
FIGURE 6 shows the voltage output waveform of the circuit of FIGURE 4A.

The operation of the relaxation oscillator of FIGURE 4A may be best explained by reference to its operating characteristics curves shown in FIGURE 5. FIGURE 5 shows the operating characteristics curve 33 of the negative resistance network of the oscillator, and the load line 34, which is a function of the input source 31 and resistor 32. In order for oscillations to occur the load line 34 must intersect the operating characteristics curve 33 at a point within the negative resistance region, e.g., shown by point "*s*" in FIGURE 5. For this condition the changes in current and voltage, V and I, during oscillation are indicated by the arrows along path *e, f, g, h*. For the portion of the path *e–f*, the capacitor 30 is charged through resistor 32. A small negative current I flows, the transistors being nonconducting. At point "*f*" the transistors conduct and the voltage V can advance no further. Since the capacitor voltage cannot change instantaneously the current jumps to point "*g*," the voltage remaining essentially constant. The capacitor then discharges through the saturated transistors at a large value of current, indicated by the path *g–h*. The voltage remains fixed at point "*h*" as the transistors cut off and the current jumps to point "*e*." This cycle repeats and the circuit oscillates producing a sawtooth waveform, shown in FIGURE 6.

The frequency of oscillation is essentially equal to the inverse of the charge time since the discharge time is a small fraction of the charge time and the switching time is almost instantaneous. Thus, the period of oscillation may be expressed as:

$$T \cong \frac{V_p - V_v}{E} \cdot RC \quad (11)$$

and the frequency of oscillation as:

$$F \cong \frac{E}{V_p - V_v} \cdot \frac{1}{R \cdot C} \quad (12)$$

These are first order approximations which are exact for values of $E \gg V_v$ and valid for purposes of explanation. It may be seen that the frequency can be increased by either increasing the input voltage E, decreasing the capacitance C or by decreasing R. Varying the input voltage is undesirable because it requires increased power, and attempting to vary the capacitance normally requires a plurality of capacitors and switching mechanisms. It is most desirable, therefore, to change the frequency by varying the charging resistance since this can be accomplished in the simplest manner.

With E and C constant and remembering that point "*s*" must be in the negative resistance region, by substituting the peak and valley current values for *E/R* in Equation 12 we see that:

$$f\ \text{minimum} \cong \frac{I_p}{(V_p - V_v)C} \quad (13)$$

and $$f\ \text{maximum} \cong \frac{I_v}{(V_p - V_v)C} \quad (14)$$

Thus, we see the ratio of maximum frequency to minimum frequency is:

$$\frac{f\ \text{maximum}}{f\ \text{minimum}} \cong \frac{I_v}{I_p} \quad (15)$$

Considering the above explanation in a qualitative manner, decreasing the charging resistor reorients the load line and moves point "*s*" towards the valley point extremity of the negative resistance region. By appreciably increasing the valley current, but not the peak current, with the addition of shunting diode 3, the frequency range of operation is greatly increased by permitting a wide variation in the value of the charging resistor 32.

In one practical embodiment of the invention as illustrated in FIGURE 4A, a frequency range in excess of 12,000 to 1 was obtained. The following circuit components and values were employed, which are given for purposes of illustration only and are not to be construed as limiting:

| | |
|---|---|
| Transistor **1** | PNP type 2N396. |
| Transistor **2** | NPN type 2N358. |
| Resistor **11** | 2.2K ohms. |
| Resistor **12** | 750 ohms. |
| Variable resistor **32** | 200 ohms to 3 megohms. |
| Diode **3** | Type 1N191. |
| Capacitor **30** | .1 μfarad. |
| Voltage source **10** | 12 volts. |
| Input voltage source **31** | 12 volts. |
| Peak voltage, $V_p$ | 0 volt. |
| Valley voltage, $V_v$ | −9 volts. |
| Peak current, $I_p$ | 4 μamperes. |
| Valley current, $I_v$ | In excess of 50 milliamperes. |

The peak and valley currents without the diode inserted were found to be 1 and 50 μamperes, respectively, which provides a frequency range of only 50 to 1. Thus, it may be seen that the total range of current, and hence frequency, is greatly extended by the addition of the shunting diode.

Although the invention has been described with reference to a few specific embodiments for illustrative purposes it may readily be appreciated that the principles set forth are applicable to other and different configurations than those alluded to with particularity. Thus, it may be appreciated that the resistor and diode embodiments may be combined by the serial connection of a resistor and a diode in the external current path. In addition, the network output terminal may be tapped to any point on the potential source 10, as well as to either of the end terminals of the source. Although the invention is seen to have wider application to negative resistance networks of "N" type characteristic, it also may be useful with negative resistance networks of "S" type characteristitcs, which have a region wherein an increase in voltage produces a decrease in current and the current is a single valued function of the voltage.

Further the invention is applicable to other than astable oscillator devices, such as monostable and bistable devices. For example, the invention may be employed in a bistable switching circuit (i.e., a circuit in which the load line intercepts the negative resistance network operating characteristics curve at two points each in a different positive resistance region) wherein it is desired to shift the current between the operating points.

The appended claims are intended to include the above modifications as well as all modifications that reasonably fall within the true spirit and scope of the invention.

What I claim as new and desire to secure by Letters Patent of the United States is:

1. A two terminal network comprising a semiconductor arrangement exhibiting current amplification having a current injecting electrode, a control electrode, a floating electrode and a current ejecting electrode, a first terminal of said network connected to said current injecting electrode, a series connection of a source of potential and impedance means connected between said control electrode and said current ejecting electrode, a second terminal of said network connected to a first point on said series connection, so that said network provides a negative resistance characteristic in response to energy applied to said terminals, an external current path including a nonlinear resistive element coupled between said floating electrode and a second point on said series connection for shunting increasing amounts of current away from said floating electrode in accordance with the voltage across said element whereby the negative resistance value of said characteristic is controlled by said current path.

2. A two terminal network comprising a pair of complementary transistors each having base, emitter and collector electrodes, the base electrode of a first transistor of said pair being connected to the collector electrode of a second transistor of said pair and the collector electrode of said first transistor being connected to the base electrode of said second transistor, a series connection of a source of potential and impedance means coupled between the collector and emitter electrodes of said second transistor, a first terminal of said network being connected to the emitter electrode of said first transistor and a second terminal of said network being connected to a first point on said series connection, so that said network provides a negative resistance characteristic in response to energy applied to said terminals, an external current path including a nonlinear resistive element coupled between the base electrode of said second transistor and a second point on said series connection for shunting increasing amounts of current away from the base electrode of the second transistor in accordance with the voltage across said element whereby the negative resistance value of said characteristic is controlled by said current path.

3. A two terminal network as in claim 2 wherein said nonlinear element is a semiconductor diode.

4. A relaxation oscillator comprising a semiconductor arrangement exhibiting current amplification having a current injecting electrode, a control electrode, a floating electrode and a current ejecting electrode, a series connection of a source of potential and impedance means connected between said control electrode and said current ejecting electrode, said semiconductor arrangement thereby providing a negative resistance characteristic in response to energy applied thereto, a capacitance coupled between said current injecting electrode and a first point on said series connection, a charging circuit including a charging resistance connected in parallel with said capacitance, said capacitance being successively charged through said charging resistance and discharged through said semiconductor arrangement at a frequency related to the magnitude of said charging resistance, an external current path including a nonlinear resistive element connected between said floating electrode and a second point on said series connection for shunting increasing amounts of current away from said floating electrode in accordance with the voltage across said element so that the negative resistance value of said characteristic is controlled by said current path and whereby said frequency can be varied over a wide range by adjusting the magnitude of said charging resistance.

5. A relaxation oscillator comprising a pair of complementary transistors each having base, emitter and collector electrodes, the base electrode of a first transistor of said pair being connected to the collector electrode of a second transistor of said pair and the collector electrode of said first transistor being connected to the base electrode of said second transistor, a series connection of a first resistor, a source of potential and a second resistor coupled in the order recited between the collector and emitter electrodes of said second transistor, said transistors thereby providing a negative resistance characteristic in response to energy applied thereto, a capacitance coupled between the emitter electrode of said first transistor and a first point on said series connection, a charging circuit including a charging resistance connected in parallel with said capacitance, said capacitance being successively charged through said charging resistance and discharged through said transistors at a frequency related to the magnitude of said charging resistance, an external current path including a nonlinear resistive element connected between the base electrode of said second transistor and a second point on said series connection for shunting increasing amounts of current away from the base electrode of the second transistor in accordance with the voltage across said element so that the negative resistance value of said characteristic is controlled by said current path and whereby said frequency can be varied over a wide range by adjusting the magnitude of said charging resistance.

6. A relaxation oscillator as in claim 5 wherein said nonlinear element is a semiconductor diode.

7. A relaxation oscillator comprising a pair of complementary transistors each having base, emitter and collector electrodes, the base electrode of a first transistor of said pair being connected to the collector electrode of a second transistor of said pair and the collector electrode of said first transistor being connected to the base electrode of said second transistor, a series connection of a first resistor, a source of potential and a second resistor coupled in the order recited between the collector and emitter electrodes of said second transistor, said transistors thereby providing a negative resistance characteristic in response to energy applied thereto, a capacitance coupled between the emitter electrode of said first transistor and a first point on said series connection, an auxiliary circuit including a variable resistance connected in parallel with said capacitance, said capacitance being alternately charged and discharged by means of said resistance and said transistors at a frequency related to the magnitude of said variable resistance, an external current path including a nonlinear resistance element connected between the base electrode of said second transistor and a second point on said series connection for shunting increasing amounts of current away from the base electrode of the second transistor in accordance with the voltage across said element so that the negative resistance value of said characteristic is controlled by said current path and whereby said frequency can be varied over a wide range by adjusting the magnitude of said variable resistance.

References Cited in the file of this patent

UNITED STATES PATENTS

| | | |
|---|---|---|
| 2,829,257 | Root | Apr. 1, 1958 |
| 2,852,680 | Radcliffe | Sept. 16, 1958 |
| 2,904,758 | Miranda et al. | Sept. 15, 1959 |
| 2,958,789 | Lee | Nov. 1, 1960 |